3,364,126
Patented Jan. 16, 1968

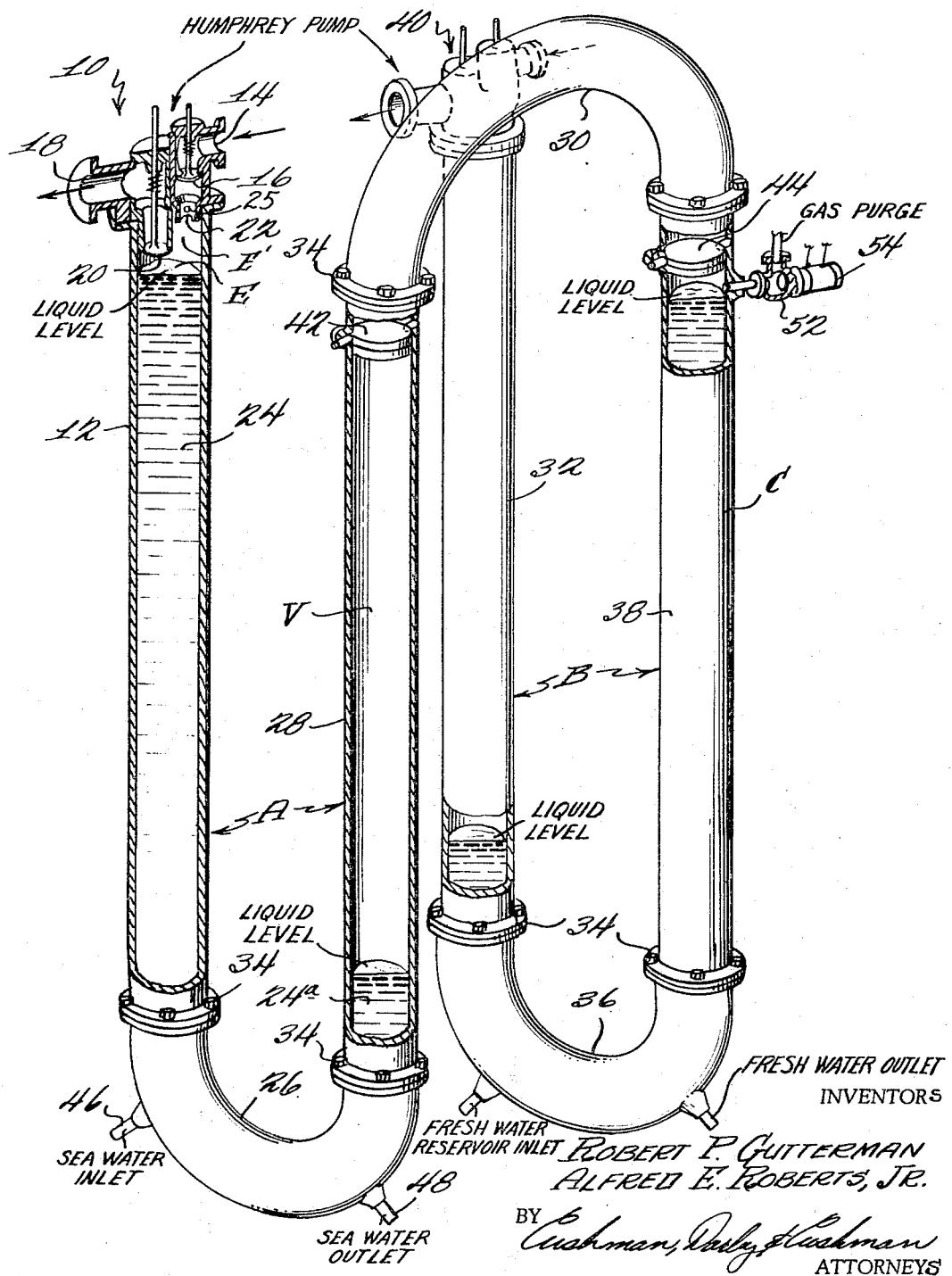

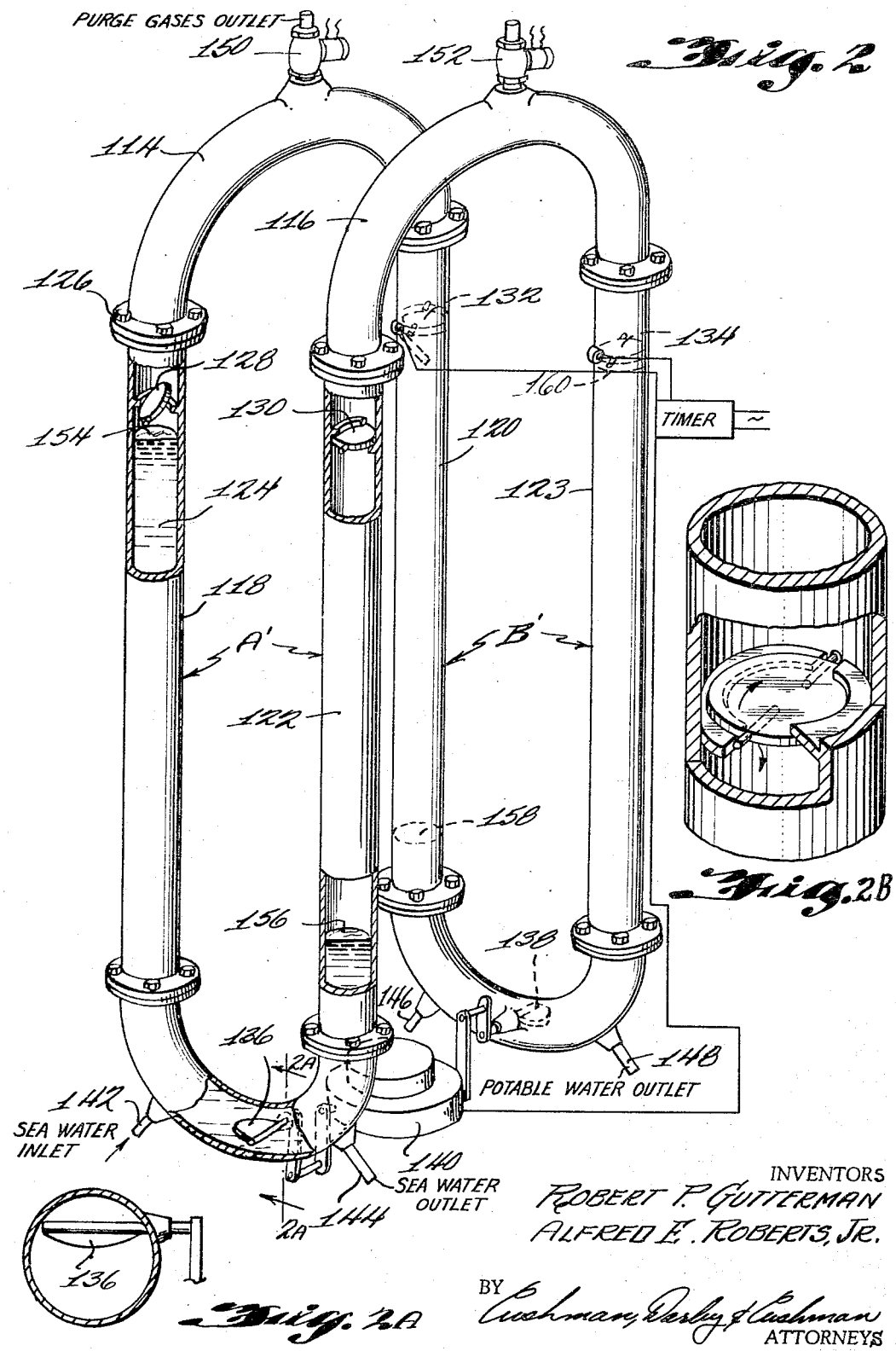

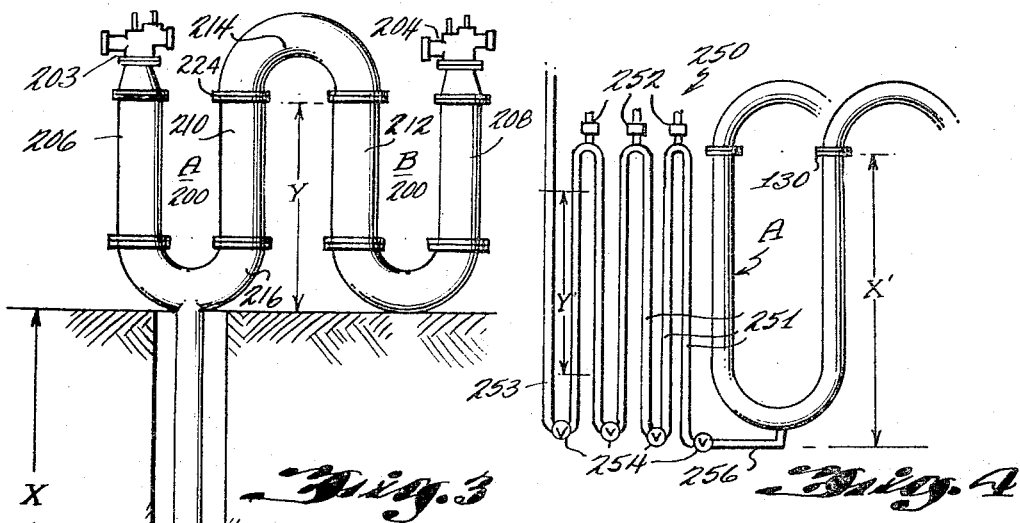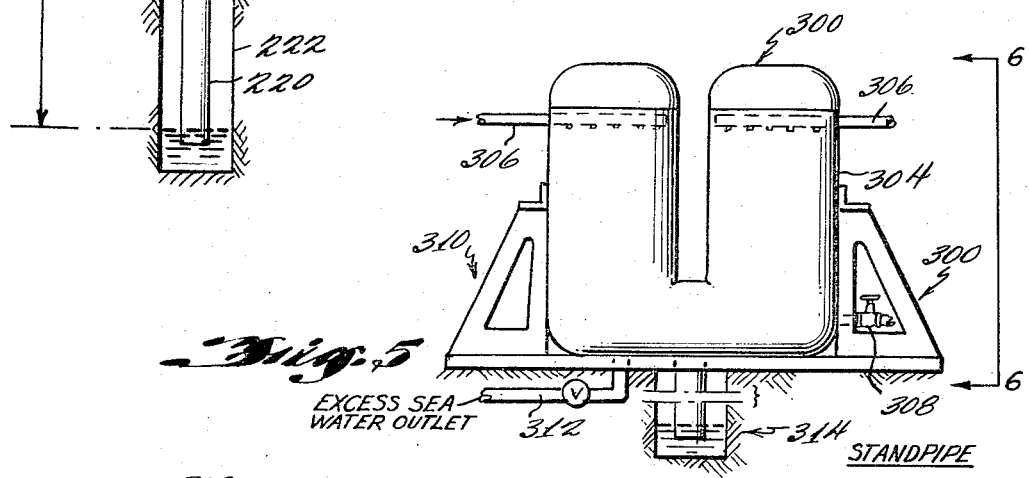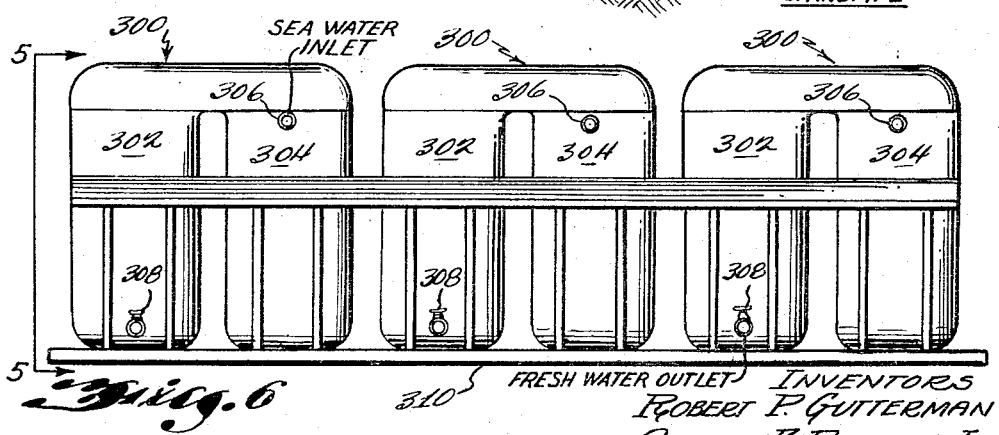

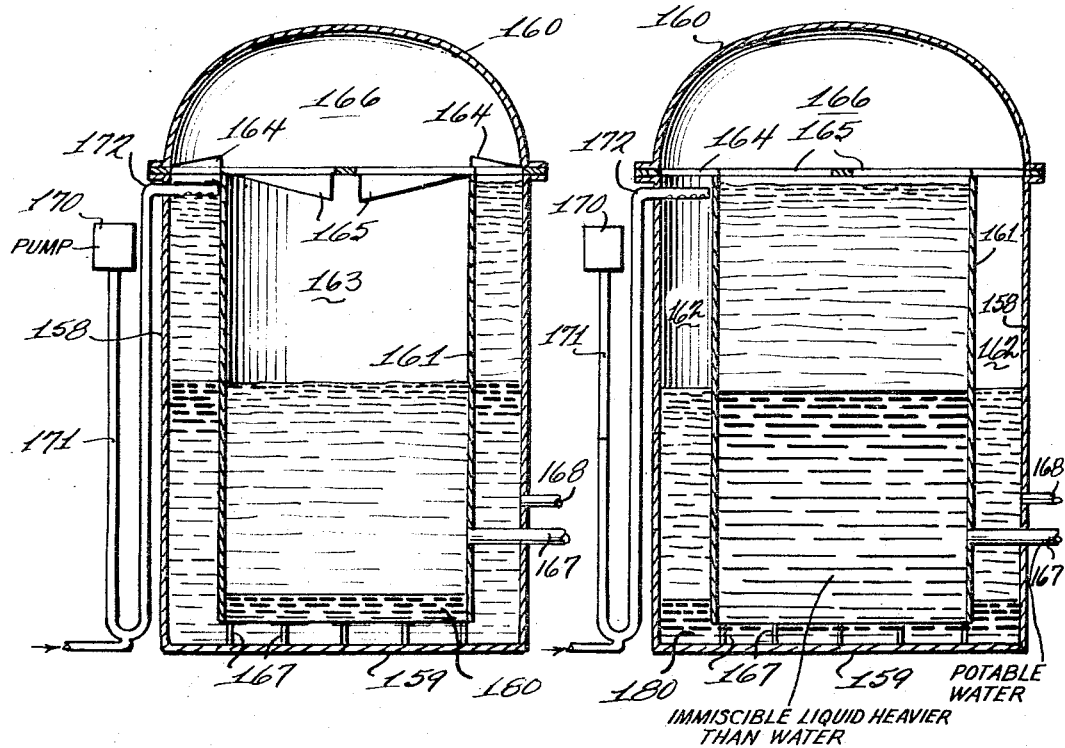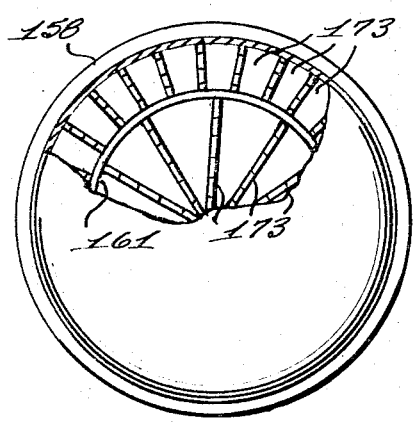

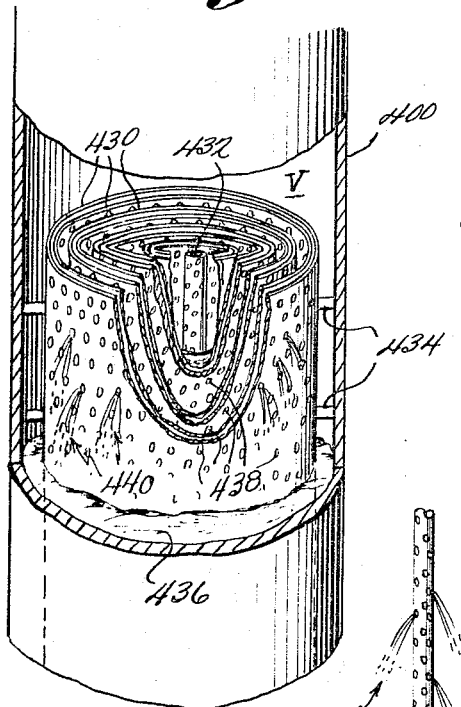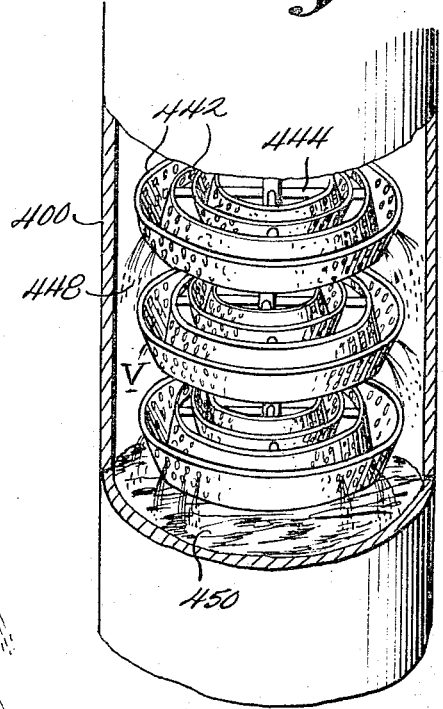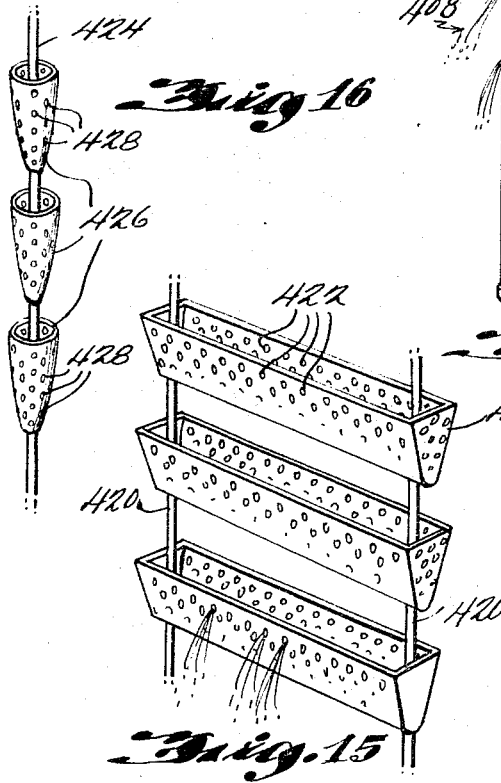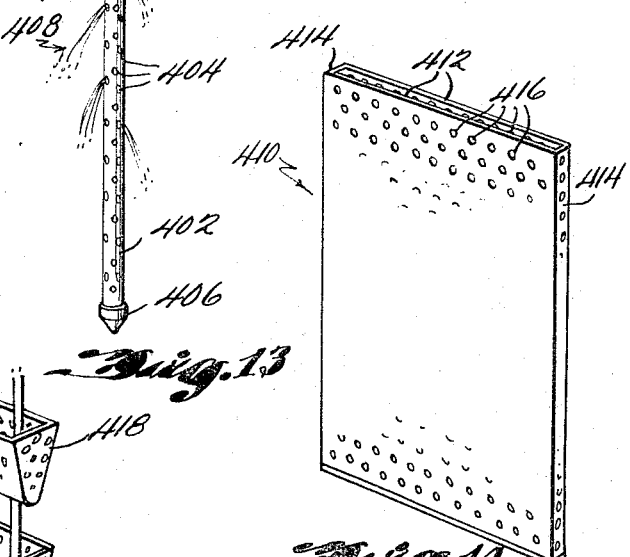
INVENTORS
ROBERT P. GUTTERMAN
ALFRED E. ROBERTS, JR.
BY Cushman, Darby & Cushman
ATTORNEYS

United States Patent Office

3,364,126
LATENT HEAT DISTILLATION AND
CONDENSATION SYSTEMS
Robert P. Gutterman, Bethesda, Md., and Alfred E.
Roberts, Jr., Falls Church, Va., assignors to General
Kinetics, Inc., Arlington, Va., a corporation of
Virginia
Continuation-in-part of application Ser. No. 288,021,
June 14, 1963. This application May 28, 1964, Ser.
No. 371,067
23 Claims. (Cl. 203—11)

This application is a continuation-in-part of our application Ser. No. 288,021, filed June 14, 1963, now abandoned.

This invention relates to the art and technology of saline water conversion. More specifically, it provides new techniques, systems, and apparatus for the conversion of saline water into fresh water at minimum cost; however, it also has more general applicability to methods for the separation of solvents from solute-solvent solutions, particularly with large volume.

Investigations and efforts have been made for a long time to establish low cost, efficient and commercially feasible systems for conversion of sea water, or other saline or brackish waters, to fresh water. Only recently have pilot plants of substantial size actually been built, and these have been operated so far primarily on a test or demonstration basis, and it is reasonable to say today that a fully satisfactory and practical solution to this problem has not been developed.

Broadly speaking, systems for the removal of the salt content from saline water, to form fresh water, may be classified in several broad groups. These are namely distillation techniques, membrane or ion exchange techniques, selective crystallization or freezing techniques, and other processes including hydration and solvent extraction proposals. The three systems which have received the greatest attention have been the distillation, membrane, or ion exchange, and freezing processes. It is a characteristic of each of these systems that two principal requirements are needed. Energy is first required to form fresh water free from salt content and energy is then required to remove the separated fresh water away from the saline water source thereof.

Thus, in distillation processes, energy is first required as heat and/or vacuum pumping to induce rapid evaporation, and then some means are employed, generally also requiring energy input, for the removal and condensation of the pure water vapor after separation. In the membrane processes, electrical energy is needed to impress a potential across the ion exchange membrane, or else some pressure source is needed in such proposed techniques as "reverse osmosis." In freezing processes, energy is again required to induce freezing of the saline water for preliminary crystal formation, and the fresh water crystals then need to be removed from the saline water mother liquor prior to melting and recovery of the desalted water.

While the various systems which have been proposed generally operated satisfactorily from a technical standpoint, their energy requirements and capital plant costs remain quite high, and they are not yet economically practical or really commercially operative except in extremely arid areas with existing very high local water costs. If the capital plant and cost can be reduced, and if the energy input requirements can be reduced, then the converted fresh water costs may be reduced to acceptable levels.

It is a primary object of this invention to provide a novel technique and apparatus which does achieve these economies. The system of this invention constitutes a significant departure from any past efforts in that the energy requirements for the initial formation of desalted water from the saline water are derived from the latent heat of the saline water itself. Substantially, the only energy input required is that which operates to bring salt water to the system and to remove the desalted water from the saline water. It will be apparent that, with such a system, practical operation costs will be minimized. The system further provides for condensation to take place without need for large refrigeration energy inputs. Moreover, the system of this invention is remarkably simple in concept and plant construction, with very few moving parts, so that original construction costs and maintenance costs are held to a minimum. The system is free from high speed motions requiring extensive lubrication, and operates at ambient temperatures, thus not requiring expensive high temperature materials. Scale formation is also avoided. For plants of equal conversion capacity, those provided by the present invention are far less expensive than those of other, previously proposed, systems, and also have minimal operating power requirements.

It is, therefore, a prime object of this invention to provide systems for the conversion of saline water to fresh water which operate with greater simplicity and efficiency than those previously provided and in which the primary source of energy for the separation of fresh water from saline or brackish water is the latent heat of the saline or brackish water itself.

More specifically, it is an object of this invention to provide a system for the conversion of saline water to fresh water in which evaporation of water from the saline water is induced at ambient temperature in a zone of reduced pressure wherein the pressure has been reduced as a result of a falling column of the saline water from that evaporation zone; and, thereafter, the thereby formed water vapor is expelled from the evaporation zone by the rising column of saline water, these steps occurring cyclically. This invention further provides a complemental system in which the water vapor is transferred into a compression zone by a column of fresh water falling in that zone and the water vapor is then condensed under very slightly increased pressure induced by a returning rising column of fresh water, these steps again being cyclical and advantageously of the same frequency and balanced against the rising and falling columns of saline water.

The manner in which the objectives of this invention are achieved, and the system operates, will be best seen and understood from the following description thereof with reference to the attached drawings.

GENERAL DESCRIPTION OF THE DRAWINGS

FIGURE 1 is an isometric view, partly cut away and in section, of an apparatus which may be used in one embodiment of this invention.

FIGURE 2 is an isometric view, partly cut away and in section, of another apparatus which may be used in another embodiment of this invention.

FIGURE 2A is a sectional view of a portion of the apparatus shown in FIGURE 2.

FIGURE 2B is a detailed sectional view of the valve structures 42, 128, etc., shown in FIGURES 1 and 2.

FIGURE 3 is an illustration in elevation of a third embodiment of this invention.

FIGURE 4 is an illustration in elevation of a fourth embodiment of this invention.

FIGURE 5 is an illustration in elevation of the end view of a fifth embodiment of this invention having a plurality of distillation and condensation units.

FIGURE 6 is a side elevational view of the embodiment of FIGURE 5.

FIGURE 7 is a sectional view of still another embodiment of this invention.

FIGURE 8 is another sectional view of the embodiment shown in FIGURE 7 at a different stage of the cycle.

FIGURE 9 is a plan view, partly in section, of a modification of the embodiment shown in FIGURES 7 and 8.

FIGURE 10 is a plan view, partly in section, of another modification of the embodiment shown in FIGURES 7 and 8.

FIGURES 11, 12, 13, 14, 15 and 16 schematically illustrate various structures which may be placed within the apparatus of FIGURES 1–10 to improve the efficiency of operation thereof, as described more fully hereinafter.

*Description of FIGURE 1*

The operation and principle of this invention may be understood by reference to the apparatus and system shown in FIGURE 1, which constitutes one embodiment of the same.

FIGURE 1 illustrates first and second U-tubes A and B having vertical arms 12 and 28 and connecting arc 26, and arms 32 and 38 and connecting arc 36 respectively. Arms 28 and 38 are also connected to each other at the top by vapor conduit 30. The upper ends of arms 12 and 32 are each fitted with a liquid-piston internal combustion engine unit 10, 40. As shown in the sectional views of engine 10, each engine includes an intake port 14 with intake valve 16, and an exhaust pipe 18 with exhaust valve 20. In the same manner as is arranged for the engine in a Humphrey gas pump, exhaust valve 20 extends significantly lower into vertical arm 12 than the intake orifice 22, and intake valve 16 is normally spring-biased to the closed position. This internal combustion engine operates generally similarly to other internal combustion engines, the piston being in this instance the water column 24 in vertical arm 12, and the spark plug 25 is energized by means responsive to the compression pressure of the fuel charge, as in a Humphrey gas pump. Because of its great mass, the water column 24 also serves as the "flywheel" of the liquid piston engine.

Vertical arms 28 and 38 are respectively fitted adjacent their tops with one-way valves 42 and 44. As shown, these valves are set just below flange elements 34 to connect vapor conduit 30 to the arms 28 and 38. It is equally satisfactory, however, to have the flange connections 34 below the valves 42 and 44. Other flange connections 34 are shown as providing a simple means of connecting curved base conduits 26 and 36 to the vertical arms to construct the U-tubes A or B. In the system shown, for operation near sea level, the length between valve 42 and the bottom of arc 26 may be in excess of 34 feet, e.g., 40 to 45 feet or more, and U-tube B is similarly designed.

In the system of FIGURE 1, valve 42 opens upwardly only and valve 44 opens downwardly only. As illustrated in FIGURE 1, the system is in a firing position, that is, an explosive gas mixture has entered through the intake port 14 and valve 16 into the upper portion E of vertical arm 12, which is the combustion chamber of the engine 10, and has been compressed by a rising column of water 24. Spark plug 25 actuated in response to pressure, as is commonly used in a Humphrey pump, then fires and explodes this combustion mixture, and the generated gases expand against the column of water 24. The water column is driven downward in vertical arm 12 and the column of water 24a in arm 28 rises, e.g., the whole water column is set in motion. As the explosion gases work on this water column, they expand to atmospheric pressure; however, at this point, the kinetic energy of the moving water column is large, and it continues to surge on into the arm 28. A vacuum is then established in the vacated space of the combustion chamber E in vertical arm 12, and exhaust valve 20 opens.

As the water column 24a continues to rise in arm 28, its kinetic energy is converted into potential energy. The system is designed so that the maximum height of the water in column 24a is just below valve 42. A water column is thus formed with a height in excess of 34 feet, i.e., a height greater than will be supported by the at most atmospheric pressure now existing in chamber E of arm 12. The water column thus falls in arm 28, valve 42 closing and remaining closed during the return stroke of the water column rising in arm 12. This return surge of water expels the gases through open exhaust valve 20 and exhaust pipe 18, until the water column 24 reaches the height of exhaust valve 20. The impact of the water against the valve 20 closes the same, but it will be seen that a volume of gases will remain in the upper portion E' of the chamber E, and acts to cushion the water column and absorb its remaining kinetic energy.

When this occurs, the water column again begins to fall, the compressed gases in chamber E' expanding during this second outward movement of the water column. When the water column drops to the level of the exhaust valve, chamber E will again be at atmospheric pressure, and further downward movement from the kinetic energy of the water column 24 creates a vacuum in chamber E opening spring-loaded inlet valve 16 to draw in a fresh change of fuel gases. At the same time as water column 24a rises in arm 28 valve 42 opens to permit discharge of the gas/vapor content of chamber V.

Again, water column 24a will rise to the level of valve 42 at which time its kinetic energy has again been converted to potential energy, and the return surge of water column 24 back up into arm 12 will commence with the fourth stroke of the cycle. Exhaust valve 20 and intake valve 16 are both closed, and the rising water column 24 compresses the combustion gases in chamber E until firing of the spark plug occurs at the predetermined compression pressure which energizes the spark plug. This fires and the gases expand, commencing a second cycle in which the just-described events are repeated.

During this four-stroke cycle, when water column 24a is rising in arm 28, during the first and third stroke, valve 42 is opened, and during the second and fourth strokes, when water column 24a is falling, valve 42 is closed and remains closed during the entire stroke. Chamber V thus acts as an evaporation chamber, the space being filled with water vapor formed above the surface of the falling column, the subatmospheric pressure causing rapid and greater evaporation. The following stroke with the water column 24a rising, and valve 42 open, discharges the water vapor formed in the preceding stroke through overhead valve conduit 30.

Essentially by this simple means a vacuum distillation of water is achieved without the use of a vacuum pump per se, the reduced pressure being generated simply by the falling column of water having a head in excess of the pressure which is present in the explosion chamber E of arm 12. By this means, the oscillating salt water column in U-tube A is caused to evaporate pure water and discharge the same into a separate zone of the apparatus.

The behavior of the water column in the U-tube is essentially analogous to the behavior of a pendulum, and the period of oscillation is roughly proportional to the square root of the length of the water column, and may be represented approximately by the equation:

$$P_o = \pi \sqrt{\frac{2L}{g}}$$

$P_o$ is the natural period, L is the length of the water column, and $g$ is the gravity constant. This equation does not consider the radius of curvature of the arc 26, or any friction in the system, and the equation for the actual period is more complicated due to the effects thereof.

As shown from experience with the Humphrey pump, an oscillating water system such as is involved in U-tube A is almost self-balancing, as to its period of oscillation, and operates at an efficiency considerably in excess of the Otto cycle. Basically, the only work done by the engine is about 4.52 seconds. Thus, in this example, there would moving water column and the interior surfaces of the pipes and that required for compression of gases. The energy required for vaporization of the water vapor in chamber V during the second and fourth stroke of the cycle is essentially supplied by the latent heat of the water.

Assuming this evaporation stage occurs at essentially isothermal and isobaric conditions for a length L of 34 feet, this general calculation for the period of oscillation is about 4.52 seconds. Thus, in this example, there would be approximately 13.3 evaporation strokes per minute.

Referring to the second U-tube system composed of vertical column 32, curved conduit 36, and vertical tube 38, this is also arranged as mentioned with an engine at the top of column 32 and the internal construction being the same as that at the top of column 12. This engine is arranged to fire 90° out of time phase with the first engine. Conduits 32, 36 and 38 contain fresh water, and the same oscillation of the water column is induced in the four-stroke cycle manner just described for U-tube A. Thus, when water column 24a is rising, and the vapors are expelled from chamber V through valve 42, valve 44 is opened and the water in column 38 is falling. Consequently, the water vapor generated during the previous stroke of the cycle is now transferred into chamber C of column 38. On the next stroke, as the water column 24a is falling in column 28 and evaporation occurs in chamber V the water is rising in column 38 and valve 44 is closed so that compression occurs in chamber C which condenses the water vapor therein.

Thus, for each sequence of firing of the engines, two evaporation strokes occur in chamber E, and two condensation strokes occur in chamber C. As water vapor is thus distilled from water in the first U-tube system, it is replaced by additonal water introduced through intake pipe 46. It is desirable to have some further circulation of water in the U-tube system to make up for heat losses in the evaporation stroke, and, consequently, several times the required amount of water are introduced through intake pipe 46, with the excess removed through outlet pipe 48.

It will be understood that, in the operation of this system, sea water may thus be continuously introduced into the first U-tube system A and fresh water is continuously condensed in the second U-tube system B. The heat of vaporization is supplied by the latent heat of the sea water, and with the circulation feature through pipes 46 and 48, the sea itself becomes an infinite heat source.

The system avoids any requirement for the use of a primary vacuum pump and, in fact, it is a feature of this invention that the reduced pressure required for an efficient evaporation of water at ambient temperatures, e.g., 65°–85° F., is obtained simply by first raising a column of water and then permitting it to fall in a closed column. Inasmuch as these are low operation temperatures, the system is free from the complex problems of scale formation and more expensive construction materials and methods are unnecessary.

This is, of course, distinct from the operating principles of the Humphrey gas pump in which the water column was actually lifted into an elevated tank and held there or else was discharged through a vertical standpipe or some other means and removed from the column. In the apparatus of the present invention, the water in U-tube A is not discharged from the top—only the water vapor is expelled.

As work with the Humphrey pump itself has shown, however, the operation of the internal combustion engine using the water column as a combined piston and "flywheel" is highly efficient, particularly when such low-cost fuels as natural gases or coke oven gases are employed as the fuel. Consequently, in many of the arid regions of the world on the shore of sea water, but wealthy in natural gas reserves, the apparatus just described in an efficient, economical and practical system for saline water conversion.

The system of the present invention also provides an advantageous solution to the problem of removing dissolved air and other gases released from the sea water during evaporation. Distillation efficiencies are severely impaired by this gas content naturally dissolved in sea water, and conventional saline distillation conversion plants have generally required special and expensive deaeration techniques. With the present system, to accomplish deaeration it is only necessary occasionally to sacrifice one stroke of the cycle, by opening solenoid 54 operated valve 52 just prior to the firing stroke of the cycle. All gas/vapor content of compression chamber C will then be expelled to the atmosphere. This valve can then be closed as the water column reaches maximum height in arm 38, and the system can then continue to operate as described. Thus, with the present system no complicated auxiliary deaeration apparatus is required, and unprocessed sea water may be used.

*Description of FIGURE 2*

The practice and concept of this invention will be further understood from the illustration of another apparatus adapted for use therewith in FIGURE 2, and the following explanation thereof.

In FIGURE 2, two U-tubes A' and B' are shown with conduit connections 114 and 116 joining them at the top. Conduit connection 114 provides communication between the vertical arm or column 118 of U-tube A' and vertical arm or column 120 of U-tube B'; and conduit 116 provides communication between vertical column 122 of U-tube A' and vertical column 123 of U-tube B'. These conduits may be suitably attached to the U-tubes by flange coupling means 126, as schematically shown, or any equivalent arrangement.

Arranged near the top of each vertical column of U-tubes is a suitable valve, schematically shown as flap valves 128, 130, 132, 134 as shown in FIG. 2B. Flap valves 128 and 130 are arranged to open upwardly for outflow of vapor into conduits 114 and 116, and to close to prevent any reverse flow of vapors back into columns 118 and 122 from conduits 114 and 116. Valves 132 and 134, on the other hand, are arranged to open downwardly to permit intake of water vapor from conduits 114 and 116, and close as to prevent any flow of vapor from columns 120 and 123 into conduits 114 and 116.

In the connecting curved portion at the bottom of each U-tube, suitable devices, e.g., paddles 136, 138 are shown and driven by an auxiliary motor 140 for oscillation from one side to another.

U-tube A' is further provided with an intake pipe 142 and an outlet pipe 144, for the addition and circulation of sea water. U-tube B' is similarly provided with intake pipe 146 and outlet pipe 148, outlet pipe 148 being used to withdraw salt-free fresh water product from the system. Conduits 114 and 116 are also provided with valved outlets 150, 152 for discharge of dissolved air.

In order to understand the operation of this invention, it will first be assumed that the apparatus shown in FIGURE 2 is so constructed that vertical columns 118, 120, 122, 123 are approximately 50 feet in height, and, for instance, some 3 feet in diameter. With this size, it will be appreciated that the difference in water levels in the two columns may be greater than 34 feet. To commence operation, and considering first only U-tube A', sufficient sea water would be introduced so that each of columns 118 and 122 would be filled to about one-half of their height and, of course, the water would be at the same level in each pipe. After oscillation is introduced, through the operation of paddle device 136 or other means, the water levels will respectively rise and fall in the two tubes in cyclical fashion, and as oscillation continues to increase in amplitude, the stage will be reached approximating that shown in the figure in which the water level in column 118 is near the top at about level 154, and in column 122 at about level 156. Valves 128 and 130 are conveniently held open during this starting-up sequence, but, once the oscillation of the water in U-tube A' has reached a sufficient amplitude so that the maximum difference in height (ΔL) between the two liquid levels is in excess of 34 feet (i.e., the maximum height of a column of water which one atmosphere of pressure will support), the operation of the valves may also be commenced.

It will now be seen that, when the water column is surging to the left and rising in the vertical column 118, the water will fill up a previously vacant space and expel whatever gases or vapors were therein through open valve 128. When the water column rises to essentially the same level as valve 128, this valve is closed. The weight of this column of water will be greater than could be supported by the pressure above the water level in column 122 (which can be assumed for the moment to be atmospheric pressure if valves 130 and 152 are both open) and, consequently, the water level in column 118 will fall, and rise in column 122.

The system is now operating analogously to that of FIGURE 1, but the energy is supplied by paddles 136, 138 instead of the Humphrey engine. Because valve 128 is closed, as the water falls in column 118, a partial vacuum is created, and evaporation of water into the space vacated by the water will be induced. As the water swings around the U-tube, and rises in column 122, with valve 128 remaining closed, a water vapor fills the volume produced in column 118. The stage is now reached at which the water level in column 122 is at substantially the same height as valve 130, and at this point valve 130 is closed and valve 128 is opened. Since, again, the height of the water in column 122 is greater than can be supported by the pressure in the system, the water now falls downwardly in column 122 and rises in column 118. As this occurs, with valve 130 closed, a partial vacuum is induced in the vacated space in column 122 and evaporation will occur above the water level therein. At the same time, the water vapor which had been formed during the previous stroke in column 118 will now be expelled through open valve 128, and thence into conduit 114.

The water column in column 118 will now again reach the height of valve 128 at which time that valve is closed and valve 130 is opened, and there is a repeat of the previous cycle in which the water falls in column 118 and rises in column 122. This time, however, because valve 130 was closed the space above the water level in column 122 is filled with water vapor and as the water level rises in that column, this vapor is also expelled through conduit 116.

The oscillating water columns in the U-tubes again essentially behave according to the laws of pendulum motion, as for FIGURE 1, if the equations properly take into account the calculations of mass and angular acceleration which have to be made in regard to the curvature of the pipe at the bottom of the U-tube, etc. It will also be seen that the only substantial loss of work through friction in the system is the friction between the water and interior walls of the vertical columns. If additional kinetic energy is not supplied, these frictional losses would eventually damp out the oscillatory motion. Accordingly, during each stroke of the cycle, paddles 136, 138 are driven by motor 140 to give sufficient impetus to the water column to overcome these losses. Advantageously, the stroke of the paddle is timed to coincide with the point of maximum velocity of the water column, e.g., when the water column passes through the stage of equal height in arms 118, 122, 120, 123 e.g., as by the Timer shown operatively connected to paddle 138 and valves 132, 134 (similar connections to paddles 136 and valves 128, 130 not being shown to avoid confusing the drawing). This action is analogous to the escapement mechanism of a clock which is similarly timed. The energy input here is, however, understandably very small in that it only need restore the losses of friction of the water against the U-tube pipes.

During each stroke of the cycle water vapor is expelled, as already mentioned, into overhead conduits 114 and 116. In order to make up for the losses thus occurring, a small amount of sea water may be introduced through intake pipe 142. As with the system of FIGURE 1, in order to avoid building up excessive brine concentrations in the system, and to have an adequate supply of latent heat, it is desirable that the amount of sea water introduced through intake pipe 142 be greater than the amount of water vapor expelled from the system, and, consequently, outlet pipe 144 is also arranged so that there can be some constant circulation of the sea water within U-tube A'. Thus, no external supply of heat is required, and it is the latent heat of the sea water which is used to accomplish this subatmospheric distillation. Under the conditions shown, and with equipment of this size, the evaporation or distillation will be substantially isothermal, and the constantly renewed supply of latent heat from the sea water will maintain such conditions. Additional heat may, of course, be supplied if desired so that the temperature of the sea water in U-tube A' is maintained at as high a level as possible. This increases the efficiency of distillation, but is an added cost factor. Similarly, the condensation side of the equipment may be cooled by circulating cool water in a surrounding jacket. This also would be a factor of extra cost.

Referring next to U-tube B', this is initially filled with fresh water to a level substantially the same as the sea water filling column A'. Here, again, the water is brought into oscillation in U-tube B', moving up and down vertical arms 120 and 123 in much the same fashion as already described for U-tube A', and synchronized therewith so that when the sea water level is falling in vertical column 122, the fresh water level is rising in arm 123, and, similarly, when the sea water is rising in arm 118, the fresh water level is falling in column 120. The water levels illustrated in FIGURE 2, exemplify the end of a first stroke in the cycle, e.g. at 158, 160.

Conversely to the valve arrangement in U-tube A', in U-tube B' valve 132 opens downwardly only when the water level in vertical column 120 is falling so that the water vapor discharged into conduit 114 through valve 128 during the rising of the sea water in column 118 is taken into column 120 through open valve 132 as the fresh water level therein is falling. On the other side of U-tube B' when the fresh water level in vertical column 123 is rising, the valve 134 is closed. It will be understood that in the previous stroke column 123 had become filled with water vapor discharged from column 122, and consequently during the stroke of the cycle shown in FIGURE 2, compression of this vapor has taken place in column 124 and, of course, condensation has occurred.

Thus, the cycle may be seen as composed of two strokes. In the sea water U-tube A', there occurs a first stroke in which evaporation is occurring in one arm and vapor formed on the previous stroke in the other arm is discharged through the overhead conduit into the fresh water U-tube B'; and in the fresh water U-tube B' each stroke involves in one arm an intake of water vapor from the overhead conduit and in the other arm a compression and condensation of the water vapor intake from the previous stroke. Overall, there occurs a distillation at subatmospheric pressure using only the latent heat of sea water in first one and then the other vertical column of U-tube A', and, correspondingly, an intake of this vapor and its subsequent condensation in U-tube B'.

The fresh water content of U-tube B' also functions as a heat sink, absorbing the heat released during the condensation stroke. This is important since a temperature rise here would interfere with the efficient condensation of the water vapor, vapor pressure increasing with temperature. The operation of U-tube B' is also essentially isothermal inasmuch as a very large heat sink is available in view of the large volumes of water. However, some circulation of fresh water may also be desirable in order to maintain the temperatures as low as feasible.

It will be understood that since evaporation is favorable in column A' by high temperatures and condensation is favored in U-tube B' by low temperatures, auxiliary heat exchange units can be coupled between these two U-tubes, if desired, to further improve efficiencies.

*Description of FIGURES 7, 8 and 9*

Such a heat exchange feature is easily accomplished in the system of still another embodiment of this invention illustrated in FIGURES 7, 8, and 9. In this embodiment, a U-tube is not employed as such, but, instead, large concentric tubes or tanks are established with a liquid coupling piston therebetween.

As shown in FIGURE 7, an outer tank 158 having a bottom 159 and a top 160 is arranged with a concentrically disposed inner tank 161 supported therewithin. Preferably, the diameters of tanks 158 and 161 are so chosen that the gross cross-sectional area of tank 158 is twice that of tank 161. Thus, the surface area of the liquid exposed in the region 162 between the tanks is approximately the same as that exposed in region 163 within inner tank 161.

The top of each tank is provided with one-way opening valves 164 and 165. These valves are provided so that, in the embodiment shown, valves 164 extend between the walls of tanks 158 and 161, and when closed, shut off the entire upper annular surface between the two tanks (see FIGURES 8 and 9). Similarly, valves 165 are also arranged so that when closed, the entire top of tank 161 is sealed shut and out of communication with the vapor space 166 under the top 160.

The lowermost end of inner concentric tank 161 is supported on the floor 159 of tank 158 by any suitable means, such as stilts 167, provided there is free communication between the annular space 162 and the inner volume 163 of tank 161. The system is now filled to a predetermined level with a liquid 180 heavier than water and also immiscible therewith, e.g., a dense, low-viscosity silicone lubricating oil. The annular volume 162 is then filled with sea water to the desired level, and a fresh water charge is also introduced into tank 161. Both the sea water and fresh water float on top of the silicone oil.

If this system is then placed in oscillatory motion, the sea water will act as an outer annular liquid piston, rising and falling in volume 162 between tanks 158 and 161, while the fresh water falls and rises within the tank 161, the motions of these two liquids being coupled together through the intermediate silicone oil. It will be thus seen that the same oscillatory motion, and compression and vaporization strokes, are achieved as with the U-tube systems illustrated in the preceding figures. FIGURE 7 illustrates the system at the end of the stroke in which distilled water vapor has been discharged through open valves 164 into the overhead vapor space 166, and sucked in through open valves 165 in the top of the inner tank 161. Valves 164, 165 are then closed, and FIGURE 8 shows the system at the end of a compression/vaporization stroke with the fresh water level high within tank 161, and sea water level low in annular volume 162 within tank 158. Outlet pipe 167 is provided to remove the condensed fresh water product, and outlet pipe 168 is provided for circulation of sea water.

The required oscillatory motion for this embodiment of the invention may be induced by any suitable baffle or mechanical piston means desired, but a more preferred embodiment is to employ a small Humphrey pump engine adjacent the tank 158. This is shown in FIGURES 7 and 8 wherein the internal combustion unit 170 is mounted on a relatively small U-tube 171 which has its pump arm 172 extending into annular space 162. The Humphrey pump U-tube may in this embodiment be a true Humphrey pump and used not only to induce the oscillatory motion, but also to introduce additional sea water into the system.

Thus, with the auxiliary Humphrey pump constructed so that its oscillatory period corresponds to that of the concentric tank system, each cycle of the Humphrey pump will eject a predetermined quantity of water into annular space 162 near its height, and this can be synchronized to occur when the sea water annulus is at the top of its stroke. This additional weight of sea water adds potential energy to the system to constitute the energy required to compensate for the frictional losses during the vaporization/condensation cycle. This is an advantageous means to introduce the added energy, since, at the same time, it discharges onto the surface of the now-about-to-fall sea water column in volume 162, water at the maximum temperature and minimum brine concentration. There is then created the optimum conditions for maximum vaporization of water during this vaporization stroke.

Of course, more than one Humphrey pump may be used as an auxiliary to the system, if desired, placed equilaterally about the sides of tank 158, so that balanced forces will be maintained. A manifold may also be used on the discharge end of Humphrey pump arm 172, to further provide an even distribution of sea water discharge into the annular volume between tanks 158 and 161. This Humphrey pump auxiliary can also be used with the embodiment of FIGURE 2 as well, in place of the paddle device, in which case inlet pipe 142 would be eliminated.

As will be seen, the surface of tank 161 will act as a heat exchange surface between the water/vapor content of columns 162 and 163, thus maintaining, again, optimum conditions for both vaporization and condensation of saline-free water. To further facilitate this heat exchange function, and also to provide maximum surfaces for the vaporization and condensation stages, each of the tanks may be divided by a plurality of perforated plates or tubes 173, seen in the partial plan view FIGURE 9. Alternatively, this surface area may be increased by providing a non-circular wall for tank 161, e.g., as shown in partial plan view FIGURE 10.

The use of various plates, tubes or other "packing" to increase the surface area within the vaporization chamber V and the condensation chamber C of the apparatus shown in FIGURES 1 and 2 is also within the scope and contemplation of this invention. Generally speaking, it is presently preferred to employ vertically disposed surfaces, so that as the water column drops in the vaporization stroke, thin layers of water will drain down along such surfaces. This forms an advantageous heat transfer configuration, so that the vaporization stage operates under as near isothermal conditions as possible. On the fresh water side, such additional surface area in the compression chamber C is advantageous in order to achieve as ideal a condensation of the water vapor as is possible, with the system as close to isobaric conditions as possible. It will be understood that so long as the vapor in condensation chamber C is condensed as the water rises therein during the compression stroke, no compression of the vapor content occurs (except for any air content), and the pressure actually remains constant. Under these conditions, no work is performed in the compression stroke, and, therefore, no energy input is required for this phase of the operation of the saline water conversion plant in contrast to conventional systems.

Generally, plates, tubes, or similar "packing" devices as are conventionally employed in present-day distillation-fractionating systems may be adapted for use in the present system.

*Description of FIGURES 3 and 4*

It is not necessary that the arms of U-tubes A and B or A' and B' be in excess of 34 feet in height in the practice of this invention. The construction of such large U-tubes is expensive, but inasmuch as the principal objective is to provide a water column height sufficient so that its potential energy exceeds the forces tending to support it, and this can be achieved by other means.

For instance, FIGURE 3 illustrates a modification of the system shown in FIGURE 1, in which Humphrey engines 203, 204 are mounted on top of arms 206 and 208 of U-tubes $A_{200}$ and $B_{200}$, and arms 210 and 212 are connected by vapor conduit 214. The lower arc conduit 216 of U-tube $A_{200}$ is in this instance mounted on top of standpipe 220 in well 222. It will be seen that when the water column in U-tube $A_{200}$ surges up arm 210 to the height of valve 224, the total water column height will be $x+y$. Thus, if a standpipe of 20 feet is used, the U-tube height need only be about 14 to 15 feet. This greatly simplifies construction and costs and also permits a more rapid oscillation, since the period of oscillation is a function of the length of the swinging column of water. Moreover, standpipe 220 may be of much less diameter than the U-tube. Thus, even if the diameter of the U-tube conduits is 10 feet, the standpipe retains its function of providing the requisite water head if only 1 foot in diameter. This arrangement can also be used, of course, as a modification of the system of FIGURE 2, to similar advantage.

Another system which also reduces the vertical dimensions of the U-tube and increases the frequency of the system is illustrated in FIGURE 4. Shown here as a modification of the system of FIGURE 2, it can also be used as a modification of FIGURE 1.

In this modification a folded manometer tube 250 is arranged with its last lower loop connected by pipe 256 to the lower arc of U-tube A. This provides a plurality of vertical pipes 251 connected serially to each other through lower and upper arc. The first vertical pipe 253 is open to the atmospheric pressure and, effectively, the vertical arm of U-tube A′ acts as the vertical arm of the last U of the series of U-tubes in the folded manometer 250. Also, as shown, each lower arc of these respective U-tubes is fitted with an in-line valve 254, and each upper arc is fitted with an outlet valve 252.

To operate this system, U-tube A′, and each of the U-tubes of folded manometer 250 are preferably filled with valves 252 open to about one-half their height, and all of the valves 254 are closed. Upper valves 252 are then all closed, and are connected one after another, to a small vacuum pump. The connected valve 252 is then opened, and the vacuum pump operated to decrease the pressure in the upper arc of the connected U-tubes, to the lowest possible level, e.g. the water vapor pressure at the ambient temperature. This valve 252 is then closed, and the vacuum pump connected to the next valve 252, and so forth, until all of the upper arcs have been thusly evacuated, and all valves 252 are again closed. At this point, the lower in-line valves 254 are opened, and because vertical pipe 253 is open to atmospheric pressure, and the upper arcs are at water vapor pressure only, the liquid levels throughout the entire manometer system shift towards the U-tube A′.

It will now be seen that, if the sum of the liquid heights in U-tube A′ (e.g. the distance $x'$ shown between the lower arc and the valve 130) plus the differential liquid heights $Y'$ in each manometer, is greater than the height of a column of water supported by atmospheric pressure, e.g. about 32 to 34 feet, then when the water column in U-tube A′ is at the height of valve 130, it will fall of its own weight, thereby pulling a partial vacuum and inducing evaporation of water in the manner already described. Thus, the system of FIGURE 4 is an alternative to excessively high U-tubes, and also to the standpipe embodiment of FIGURE 3.

Systems such as this are advantageous arrangements to enable practical construction of the most efficient apparatus configurations. As will be brought out now, power requirements are a function of the amplitude to the third power, the first power of the diameter of the U-tube conduit, and the inverse square root of the length of the water column. Production of water is favored within limits, of course, by increase in the frequency of oscillation, which is also a function of the inverse square root of the water column length. Accordingly, it is most advantageous to be able to vary dimensions of the U-tubes, or concentric tanks, independently of a requirement for a thirty-two foot column of water therewithin.

DISCUSSION OF THE MATHEMATICAL BASIS AND EFFICIENCIES OF THE SYSTEM

As mentioned above, the system illustrated in FIGURE 1 uses elements of the Humphrey pump, and, consequently, its efficiencies may be calculated from the figures already known and derived from operation of the Humphrey pump itself. These have been published in, for instance, The Proceedings of the Institution of Chemical Engineers (London), November 1908, pages 1075–1200. Curves comparing the Humphrey pump cycle with the Otto cycle are, for instance, shown at pages 1107–1108.

For the system shown in FIGURE 2, other calculations can be made to show the work required to overcome the frictional losses in the system. These calculations apply, of course, also to the embodiment of FIGURE 1 in respect to these same frictional losses, but the following development is specifically directed to the embodiment of FIGURE 2.

The potential energy of the U-tube system shown in FIGURE 2 may be represented by the equation:

(a) $$\text{P.E.} = \rho \frac{\pi D^2}{4} x \cdot xg = \frac{\pi}{4}\rho g D^2 x^2$$

wherein $\rho$ is the density of the water; $D$ is the diameter of the tube; $x$ is the displacement of the level of the water column at any given time with reference to the position of rest, or the mean position of the non-oscillating column; and $g$ is, of course, the gravity constant. The kinetic energy of the system may be represented by the equation:

(b) $$\text{K.E.} = \frac{1}{2}\rho \frac{\pi D^2}{4} \Lambda \cdot v^2 = \frac{\pi}{8}\rho \Lambda D^2 v^2$$

wherein $\Lambda$ represents the length in feet of the column of water and $v$ stands for the velocity. If $k$ represents the amplitude or maximum displacement of the system, then:

(c) $$\frac{\pi}{8}\rho \Lambda D^2 v^2 + \frac{\pi}{4}\rho g D^2 x^2 = \frac{\pi}{4}\rho g D^2 k^2$$

That is, at any given point in the oscillation, the combined potential energy and kinetic energy of the water column will equal the potential energy of the system at maximum amplitude. This last equation simplifies to the relation:

(d) $$v^2 + \frac{2g}{\Lambda}x^2 = \frac{2g}{\Lambda}k^2$$

For sinusoidal motion, the displacement $x$ is represented by the equation:

(e) $$x = k \sin \omega t$$

and the velocity V is represented by the equation:

(f) $$v = k\omega \cos \omega t$$

wherein $\omega$ is the angular velocity. Substituting these values in Equation (d) above, gives the relationship:

(g) $$\omega^2 = \frac{2g}{\Lambda}$$

whence (h) $$\omega = \sqrt{\frac{2g}{\Lambda}}$$

The period T of the pendulum system is thus represented by the equation:

(i) $$T = \frac{2\pi}{\omega}$$

and hence for the system in question, (j) $$T = \pi\sqrt{\frac{2\Lambda}{g}} = .785\sqrt{\Lambda}$$

That is, the period of the oscillation of the water column in, for instance, U-tube A' of FIGURE 2 is a function of the square root of the length of the water column, and is independent of the diameter of the U-tube. To determine the frictional losses which occur in this system, these can be measured in terms of an equivalent drop in pressure or $\Delta P$ which must be compensated for during each cycle or complete cycle of the water column. This pressure drop is given by the equation:

(k) $$\Delta P = f \cdot \frac{\Lambda}{D} \cdot \frac{\rho v^2}{2}$$

where $f$ stands for the frictional factor. The work W, per cycle, performed to overcome this pressure drop is then given by the integral:

(l) $$W = 4 \int_0^{T/4} \Delta P \frac{\pi}{4} D^2 \cdot v \, dt$$
$$= \frac{\pi}{2} \rho \Lambda D \int_0^{T/4} f v^3 \, dt$$

However, the friction factor $f$ is determined by the relationship:

(m) $$f = f(R) = f\left(\frac{VD}{\nu}\right) = f\left(\frac{k\omega D}{\nu} \cos \omega t\right)$$

wherein R is the Reynolds number (a dimensionless characteristic of the flow) and $\nu$ is the kinematic viscosity ($1.083 \times 10^5$ ft.²/sec.). Thus, the friction factor is given by the equation:

(n) $$f = f(R_m \cos \omega t)$$

wherein $R_m$ is the maximum Reynolds number, given by the equation:

(p) $$R_m = .923 \times 10^5 k\omega D$$

($k$ and D in feet, $\omega$ in inverse seconds). The integration above, may then be written as:

(q) $$\int_0^{T/4} f v^3 dt = k^3 \omega^2 \int_0^{\pi/2} f(R_m \cos \tau) \cos^3 \tau \, d\tau$$
$$= \rho g D k^3 \bar{f}$$

wherein $\tau$ represents $\omega t$ taken as integration variable and $\bar{f}$ is an average friction factor. Over a wide range of variation of R, $f$ can be satisfactorily represented by an empirical formula of the form:

(r) $$f = c_1 + c_2 R^{-q}$$

(See Lees, Proc. Roy. Soc. (London), vol. 91, p. 46 (1915)). Thus, the average friction factor may be evaluated as:

(s) $$\bar{f} = c_1 \int_0^{\pi/2} \cos^3 \tau \, d\tau + c_2 R_m^{-q} \int_0^{\pi/2} \cos^{3-q} \tau \, d\tau$$

$$= \frac{2}{3} c_1 + c_2 R_m^{-q} \cdot \frac{\sqrt{\pi}}{2} \cdot \frac{\Gamma(2-q/2)}{\Gamma(2.5-q/2)}$$

wherein $\Gamma$ represents the gamma function and $q$ is the empirical exponent in Formula (r). For water flowing in relatively smooth pipes, the empirical value of $q$ is found to be 0.35; thus:

(t) $$\bar{f} = .667 c_1 + .702 c_2 R_m^{-q}$$
$$= .702 f(R_m) + .035 c_1$$

The value of $.035 c_1$ will be found to be of substantially smaller magnitude than the outer term in this equation; consequently, the average friction factor can be well approximated by:

(u) $$\bar{f} = .702 f(R_m)$$

That is, the average friction factor can be estimated as .702 times the friction factor measured at the maximum Reynolds number.

Now taking the value of $\rho g$ as 64 lb./ft.³ for the water column system, then the work W required to make up the frictional losses per cycle is given in foot-pounds by the equation:

(v) $$W = 141 \cdot f(R_m) \cdot Dk^3$$

which can be expressed as the power requirement P in foot-pounds per second by the equation (obtained by dividing by the period $.785 \sqrt{\Lambda}$):

(w) $$P = 180 \cdot f(R_m) \cdot \frac{Dk^3}{\sqrt{\Lambda}}$$

or, in terms of horsepower, the power requirement $P_{H.P.}$ for this is approximately:

(x) $$P_{H.P.} = \frac{1}{3} f(R_m) \cdot \frac{Dk^3}{\sqrt{\Lambda}}$$

D, $k$ and $\Lambda$ in feet. This is the amount of power required in the system to overcome the frictional losses occurring during the oscillation in each complete cycle of the column of water in one U-tube.

To calculate this power requirement for an actual case, a system such as that shown in FIGURE 2 can be considered in which the internal diameter D of the arms 118, 122 is 10 feet, and the stroke of the system is 13 feet, so that the amplitude $k$ is 6.5 feet. The total length $\Lambda$ of the water column 124 is 50 feet. The maximum Reynolds number $R_m$ for this system is about $8.65 \times 10^6$, so that the friction factor as shown in the above relationships has a numerical value of about 0.009. The period T of the system then has the value 5.55 seconds per cycle (Equation j) and, thus, the angular velocity $\omega$ has the value 1.13 (Equation i).

Putting these values in Equation $x$ gives the horsepower requirement $P_{H.P.}$ as (y) $$P_{H.P.} = \frac{1/3 \times .009 \times 10 \times 6.5^3 = 1.17}{\sqrt{50}}$$

This power requirement of 1.17 horsepower is that required for each complete cycle of the water column in U-tube A'. Inasmuch as there are two evaporation strokes in each cycle, one in arm 118 and one in arm 122, and the system under consideration has a stroke of 13 feet for a 10 foot diameter tube, the volume of the vapor formed in each cycle is approximately 2000 cubic feet. A similar amount of power is, however, required also to overcome the friction losses in U-tube B', and, consequently, the horsepower requirement for the generation of 1000 cubic feet of water vapor per cycle in this system is approximately 1.17 horsepower. The period of the system will produce approximately 15,500 cycles per day, or 31,100,000 cubic feet of water vapor per day. The weight of the salt-free water thus produced is a function of the vapor pressure of the water at the ambient temperature, and may be determined from the following table:

TABLE I

| T., °F. | P.s.i. | Vg, ft.³/lb. | Vg⁻¹, lb./ft.³ | Condensed gallons per ft.³/vapor |
|---|---|---|---|---|
| 50 | .178 | 1,703 | .0006 | .00072 |
| 60 | .256 | 1,206 | .00083 | .0001 |
| 70 | .363 | 867 | .00115 | .00014 |
| 80 | .506 | 633 | .00158 | .0002 |
| 90 | .698 | 468 | .00213 | .00025 |
| 100 | .949 | 350 | .00283 | .00034 |

From this table it will be seen that at a water temperature of 80° F., the vapor pressure in pounds per square inch is .506 and the volume of a pound of water vapor is 633 cubic feet. Thus, there is .00158 pound per cubic foot of water vapor, or 1 cubic foot of water vapor at 80° F. yields approximately .0002 gallon of condensed salt-free water. Thus, the production of the system just described is 6220 gallons per day.

The power requirement for a day's operation is thus 56.2 horsepower hours, and, consequently, for this system and temperature, 9.04 horsepower hours are required per 1000 gallons of water produced. At 746 watts per horsepower, this is 6.7 kilowatt hours per 1000 gallons of fresh water. At a cost of one cent per kilowatt hour, this means, of course, that 1000 gallons of converted fresh water are produced at an operating cost of about seven cents. The theoretical minimum possible requirement to separate fresh water from sea water is approximately 3 kilowatt hours per 1000 gallons of water.

DESCRIPTION OF THE EMBODIMENT OF FIGURES 5 AND 6

To fully utilize the principles and system of this invention in a commercial apparatus, it is, of course, desirable to construct a plurality of U-tube or tank units so that the overall desired large production of fresh water will be achieved without the construction of unnecessarily large single units. FIGURES 5 and 6 illustrate one form in which this may be done.

As shown, a plurality of U-tubes 300 of the general arrangement as shown in FIGURE 2 are arranged and supported by suitable framing members 310. As seen in FIGURE 6, U-tube 302 is one the fresh water cycle and U-tube 304 contains the oscillating salt water. FIGURE 5, which is taken from the righthand end of FIGURE 6, shows the intake pipes 306 which are arranged to be connected to a Humphrey pump unit as illustrated in FIGURES 7 and 8, and for the introduction of successive pulses of sea water in synchronization with the oscillation of the salt water column in the U-tube. Fresh water U-tubes 302 are similarly provided with valved outlet pipes 308. Valved sea water outlet pipe 312 is also provided to take off excess sea water which may be introduced through pipes 306 for purposes of optimum temperature conditions and also to avoid brine concentration build-up as previously described. The system is also shown with a standpipe arrangement 314, in the manner related for the description of FIGURE 3, but this equipment can also be constructed with a folded manometer system as shown in FIGURE 4.

It will be understood that the respective water columns in the system are then oscillated, as has been mentioned, and the oscillation maintained, e.g. through the operation of an auxiliary Humphrey pump system. While very large masses of water will thus be customarily rising and falling and surging back and forth in these U-tubes, which may be of great internal diameter, e.g. 10 to 15 feet, the resulting forces are self-compensating to a large degree. Thus, as the water column surges to the left in fresh water column 306, it will be surging to the right in sea water column 304. If a second bank of these U-tubes is then constructed adjacent and parallel to that shown, and the two structurally linked together but with the oscillations 180° out of phase, the system further compensates for the stresses and strains built up through the water movements.

It is quite possible, of course, to vary these constructions considerably, and this invention is in no way limited to the specific embodiments specifically shown. For instance, for the system of FIGURES 5 and 6, it is equally satisfactory to employ one Humphrey pump to raise the sea water to an elevated tank, which then delivers successive pulses of water, through a quick-opening timed valve in pipe 306, as the system requires. Moreover, the U-tubes themselves may be partially buried in the ground, below sea level, so that no considerable energy in pumping is required to elevate the sea water to the top of the column.

A further desirable arrangement for the invention is to provide a large shallow excavation acting as sea water reservoir which may be heated by the sun to raise the ambient temperature of the water several degrees, thus adding greatly to the efficiency of evaporation.

When embodiments such as that shown in FIGURES 1 and 3 are employed, with a Humphrey engine inducing the sea water column oscillation, control of the oscillation so that the water column will not rise above valve 42 is quite simple. It will be appreciated that, as the Humphrey engine fires successively, the water column height in arm 28 will continue to rise to successively higher levels, and any suitable simple sensing device may be arranged just below valve 42 to read out the water level. When the water level thus reaches the predetermined maximum desired height, this signal may suitably short out spark plug 25 and at the next stroke the engine 10 simply will not fire, the spark plug will remain shorted out until the amplitude of the water column oscillation recedes to a safe operating level.

It is also apparent that the sea water U-tube system may be employed as a water vapor source for conventional condensation equipment, just as the fresh water condensing U-tube may be operated with any other source of water vapor, such as steam generated from an atomic energy device or a steam-driven hydroelectric plant. In each instance, the oscillating water column will lend its low-cost efficiency to the resulting combination.

It will be understood in these instances that, for the condensation U-tube unit, it is not necessary to have a column of water in excess of 34 feet in height, as is shown in FIGURE 3. It is also true that the vaporization U-tube units may also be operated in such fashion provided that the overhead vapor conduit arc (e.g., 214 in FIGURE 3) is evacuated and operates under less than atmospheric pressure. For the embodiment of, for instance, FIGURE 2, the oscillation of water columns would then continue with formation of a still lower vaporization pressure during each vaporization stroke. However, this is not presently considered the preferable arrangement for this apparatus because it is not as adaptable for "blowing" the dissolved air and carbon dioxide content from the sea water out through valves 150, 152 (in FIGURE 2) or 52 (in FIGURE 1). It can be done, of course, but auxiliary vacuum pump equipment is then required in order to again pull down the pressure in the overhead vapor conduits.

Among the many advantages for the saline water conversion equipment in addition to those already mentioned provided by the present invention are the freedom from scale formation, lack of need for high temperature construction materials, minimum number of moving parts and no high speed moving parts, relative low cost of construction, feasibility of operation on low cost fuel sources, etc.

Other modifications and embodiments will also suggest themselves to those skilled in the art from the foregoing description. For instance, it is obviously not necessary to have sea water in the folded manometer tube 250 of FIGURE 4, and instead a mercury manometer may be equally well used, and in the same fashion for the same result. Further, and referring to FIGURES 7 and 8, it can be appreciated that a single auxiliary Humphrey pump with a rapid cycle may be used to supply sea water to more than one evaporating chamber through a manifold system or the like. Still further, the auxiliary Humphrey pump arrangement may be used in conjunction with either the FIGURES 7-8 embodiment or the U-tube method of FIGURE 2, in which the sea water admitted through the Humphrey pump is introduced during the falling of the water column through a supply head, to assist in achieving maximum evaporation.

The operation and apparatus of this invention may also be submerged in the saline water source, as at the end of a pier or wharf. In such an arrangement, the walls surrounding the evaporation and condensation chambers may be in heat exchange contact with a sea water heat reservoir and sink. By this arrangement essentially isothermal operation is facilitated.

As disclosed, it is also possible to use this system in conjunction with an industrial or power plant which utilizes saline water for cooling or heat exchange purposes, and wherefrom the saline water is discharged from the plant at higher than ambient temperatures. This heated sea water discharge from the plant may then be used as input sea water to apparatus of the present invention providing higher temperatures at no additional cost in the vaporization zone, whereby the efficiency of evaporation is significantly increased. In this embodiment of the invention, it is advantageous to provide for direct or indirect heat exchange devices and means between the condensation and vaporization chambers or zones of the apparatus in order to maximize the efficiency thereof.

Other variations and refinements of the invention include, within the features already discussed, means whereby the evaporation of water may be enhanced over and above simple surface films of the rising and falling columns of water, should such surfaces not be capable of yielding sufficiently rapid heat transfer and vaporization rates to provide the desired optimum production. This may be accomplished not only by the introduction of additional wettable surfaces but also by means of structures which present low resistance to flow while the water column is rising but which trap moderate quantities of water when the column begins to fall, releasing the trapped water in the form of broken streams and droplets at a volumetric rate equal to, or slightly less than, that of the retreating column surface. Such a percolating structure can increase the effective surface-to-mass ratio of the water to almost any desired degree. This technique may also utilize the heat conduction and absorption capabilities of the materials of construction of the walls and baffles.

FIGURES 11–16 illustrate suitable elements which when placed in the vaporization/condensation zone of the apparatus of this invention especially assist the vaporization of the water, which structures and elements may be placed within the evaporation chamber V of any of the apparatus previously discussed and illustrated in the drawings, e.g. those of FIGURES 1, 2, 3, 4, 5–6 and 7–8, to maximize the water vapor production in each stroke of the cycle. It has already been mentioned that various plates, tubes or other "packing" to increase the surface area are within the scope of the invention (e.g. FIGS. 9 and 10 and description), whereby thin surface layers of water will form, and it is also within the scope of the invention to provide such plates, tubes or other packing with specific means for the formation of discrete droplets or broken streams of water. In this manner, as the water column falls during the evaporation stroke, thereby pulling a partial vacuum in the column as above described, droplets are formed to further multiply materially the surface area exposed for vaporization in each stroke.

In FIGURE 13, there is illustrated a tube 402 perforated with a plurality of holes 404, and which may be closed at the bottom 406. Such a tube is placed within the evaporation chamber V of the various embodiments of the apparatus previously discussed and fills with water when the water column rises, and during the falling stroke of the cycle, the water within the tube will be discharged through the holes as a fine stream which breaks into discrete droplets 408. Obviously, a plurality of such tubes, as many as desired, may be placed within the vaporization chamber V.

In place of the tube of FIGURE 13, the element may have a plate-form as shown in FIGURE 14 in which the sidewalls 412 and endwalls 414 of the rectangular sheet metal box 410 are perforated with a plurality of holes 416. Again, such a structure placed within the vaporization chamber V will discharge water therefrom through the holes 416 in the form of a broken stream and discrete droplets; and, again, a plurality of such structures, as desired, may be placed within the chamber.

FIGURE 15 illustrates a further embodiment in which a plurality of troughs 418 are suspended by any suitable mechanical means, e.g. rod hangers 420, and each trough includes a plurality of perforations 422 in its walls for the similar discharge of a broken stream and discrete droplets of water. Still a further embodiment is shown in FIGURE 16 in which a supporting member 424 is provided with a plurality of generally cup-shaped members 426 each perforated by a plurality of holes 428 for the discharge of water trapped therein during the falling stroke of the cycle.

FIGURES 11 and 12 illustrate the placement of suitable droplet-forming elements within the vaporization chamber V of the column 400. In FIGURE 11, the droplets are formed by means of a plurality of concentrically-disposed annular well-shaped members 430 (which are essentially the curved counterparts of FIGURE 14). The central tube 432, corresponding to the structure shown in FIGURE 13 may also be provided, and the entire assembly may also be suspended by any suitable hanging devices 434. As shown, when the water column 436 has fallen below the holes 438 in the droplet-forming means 430, the stream of water is discharged which breaks into discrete droplets 440. In FIGURE 12, the droplet-forming means 442 comprises a plurality of annular troughs (the circular counterpart of the structure of FIG. 15) supported by any suitable mechanical means 444, and with similarly perforated walls whereby the water streams break into falling discrete droplets 448 when the water column 450 has fallen therebelow in the column 400.

It will be understood that in any individual arrangement, the diameter of the perforations and the spacing of the respective droplet-forming elements from each other in the apparatus will be predetermined as a matter of engineering design according to the over-all size of the apparatus, its periodicity and to some extent according to the expected ambient water temperature for the water operation. The drawings herein are, of course, schematic in nature to facilitate the illustration of the respective elements and structures.

With respect to the design requirements for this portion of the system, the practical rates of evaporation and condensation achievable in vacuum evaporators employed for removal of water from various dissolved materials are tabulated in Mark's Mechanical Engineers Handbook. For simple water surfaces, the heat transfer coefficient is given as about 385 B.t.u. (British Thermal Unit) per square foot per hour per degree Fahrenheit. For simple exposed circular surfaces of a diameter of 10 feet, there is an area of approximately 75 square feet. As developed above, a heat transfer rate on each side of the two columns of 35,740 B.t.u. per minute is needed, on the average. Actually, however, this surface area is effective for only one-half of the time in each stroke. Therefore, an actual rate of 71,480 B.t.u. per minute is needed while the evaporation or the condensation is taking place. At the heat transfer rate quoted above, the simple surface can produce $75 \times 385 \div 60$ B.t.u. per minute or only 481 B.t.u. per minute. Therefore, the required surface multiplication factor to be produced by the special structures discussed above must be $71,480 \div 481$ or about 148.

If a 1° F. temperature differential above and below the ambient temperature is to be maintained as the equilibrium condition throughout the system, one side must be cooled and the other heated, during evaporation and condensation respectively, of a total of 55 cubic feet of water vapor per stroke. Thus, if dependence is placed on multiplying the water surface alone, the calculation shows it is simply necessary to form water droplets during each falling stroke on each side of the system for a volume of approximately a 9-inch depth of the 75 square foot basic area.

It is also necessary that the droplet size achieved during area multiplication does not become so small that there is danger of saline water mist carry-over to the fresh water condensation chamber during the vapor transport. Multiplication of surface area of 10,800 square inches (75 square feet) by the above multiplication factor of 148, produces a resulting required surface area of about 1,600,000 square inches. For the equilibrium conditions to be maintained, this surface area must contain the total heat exchange water volume per stroke of 55 cubic feet or about 95,000 cubic inches. If spherical droplets of equal size are assumed, this only requires a droplet diameter of about ⅜ inch, a sufficiently large dimension to ensure that saline spray or mist carry-over is easily avoided in the design of the system.

It will therefore be appreciated that this invention may be practiced in apparatus, embodiments and systems other than those specifically illustrated in the drawings and discussed in the specification, and, accordingly, our patent is limited only by the spirit and scope of the following claims.

We claim:

1. A system utilizing the latent heat of a liquid solution for evaporation and distillation of said solvent therefrom, which comprises:

means maintaining a column of said liquid solution;

means alternately raising and lowering the height of said solution column;

means closing the top of said column-maintaining means at the commencement of and during the said lowering of said solution column, thereby causing the formation of a space of subatmospheric pressure above said solution column and within said column-maintaining means, and inducing evaporation of said solvent into said space;

means opening the top of said column-maintaining means during the said raising of said solution column, to permit discharge of the solvent vapors in said space;

means maintaining a second column of liquid;

means alternatively raising and lowering the height of said second liquid column;

means for transporting said solvent vapors to the top of said second liquid column-maintaining means;

means opening the top of said second liquid column-supporting means during said lowering of said second liquid column to permit entry of said solvent vapors into the space above said lowering second liquid columns; and, means closing the top of said second liquid column-maintaining means during said raising of said second liquid column whereby said vapors are condensed in said liquid as said liquid column rises.

2. In an apparatus of the class described, first and second U-tube means adapted for containing liquids therein, said first U-tube means having a column of liquid solution and said second U-tube means having a column of solute-free liquid, each of said columns extending into at least a portion of each vertical arm of said respective U-tube means;

means for oscillating each of said liquid columns in said first and second U-tube means, for first raising and then lowering the solution column height in a first vertical arm of said first U-tube means and at the same time first lowering and then raising the liquid column height in the corresponding first vertical arm of said second U-tube means;

respective valve means disposed in each of said vertical arms of said U-tube means at a height substantially that of the maximum height reached by the liquid columns therein;

means closing the said valve means in said first arm of said first U-tube means when the solution column therein is falling, and opening said valve means when the solution column therein is rising;

and means opening the valve means in said vertical arm of said second U-tube means when the column of solvent therein is falling, and closing the said valve means when the solvent column therein is rising;

and conduit means for carrying the vapor and gases expelled from said first arm of said first U-tube means when said solution column therein is rising into said vertical arm of said second U-tube means to permit the said vapors and gases to be drawn through the open valve means and into said vertical arm of said second U-tube means as the liquid column in the latter is falling.

3. An apparatus for the production of salt-free water from brackish or sea water, of the class described, comprising first and second U-tube means;

first conduit means connecting respective first arms of said first and second U-tube means at their top, and arranged to permit the passage of vapors through said first conduit means;

second conduit means connecting the respective second arms of said first and second U-tube means, and arranged to permit the passage of vapors through said second conduit means;

means inducing and maintaining cyclical oscillation of salt-containing water in said first U-tube means so that the first arm therein is first filled with the salt-containing water and then said second arm is filled;

means for similarly cyclically oscillating salt-free fresh water in said second U-tube means, approximately 180° out of phase with said oscillation in said first U-tube;

valve means for controlling communication between the said respective conduits and said respective arms, and disposed above the maximum height reached by the respective liquid columns in said arms;

means for opening said valve means in each of said arms of first U-tube means when the salt-containing water column is rising in said arm, and for closing the said valve means when said column of salt-containing water is falling;

means closing said valve means in each of said arms of said second U-tube means when the column of fresh water is rising therein, and means opening said valve means in each said arm of said second U-tube means when the fresh water column therein is falling;

whereby water vapor formed during the falling of the column of salt-containing water in said arm of said first U-tube means is expelled from said arm, on the rising of the latter said column of salt-containing water, and said expelled vapor is then passed through said conduit into the said arm of corresponding second U-tube means, and said vapor received in said latter arm of said second U-tube means is condensed during the rising of the fresh water therein.

4. In an apparatus of the class described U-tube means adapted for containing a liquid solution therein, and having column of said solution extending into at least a portion of each vertical arm of said U-tube means, means for oscillating said solution in said U-tube means, first raising and then lowering the column height in a first vertical arm of said U-tube means, and first lowering and then raising the height of the column in a second arm of said U-tube means;

valve means disposed in each of said vertical arms of said U-tube means at a height the maximum height reached by the column of solution therein;

means closing the valve means in each respective arm when the solution column therein is falling;

means opening said valve means in each respective arm when the solution column therein is rising, and means for carrying vapor and gases expelled through said open valves and transporting the same to means for condensing the vapors.

5. An apparatus for the production of salt-free water from brackish or sea water comprising first and second U-tube means having respective first and second vertical arms, said first U-tube having a column of brackish or sea water therein and said second U-tube having a column of salt-free water therein, each of said respective water columns partially filling the vertical arms in said respective U-tubes means;

liquid piston internal combustion engine means operatively connected to each of said first arms for cyclically causing a rapid expansion of gases above the water columns therein whereby said water columns are first driven downward and into said second arms and then allowed to flow back into said first arms;

vapor passage means connecting said second arms above the respective columns of water therein and adapted to be opened and closed;

said vapor passage means and said engine means being arranged so that when the brackish or sea water column is rising in said second arm of said first U-tube the salt-free water column in said second arm of said second U-tube is falling and said vapor passage means are open, and when the brackish or sea water column is falling in said second arm of said first U-tube and rising in the second arm of said second U-tube, said vapor passage means are closed.

6. The apparatus of claim 5, wherein said engine means comprise an inlet port and inlet valve, an exhaust pipe and exhaust valve, and ignition means responsive to the compression pressure of fuel gases admitted through said inlet port and inlet valve and above the respective column of water in said respective first arms.

7. Apparatus for utilizing the latent heat of brackish or seat water to evaporate and distill salt-free fresh water therefrom which comprises a pair of U-tubes each having at least two vertical arms, the first of said U-tubes containing brackish or sea water, and the second of said U-tubes containing salt-free water;

first vapor passage means connecting respective first arms of said pair of U-tubes and second vapor passage means connecting respective second arms of said pair of U-tubes;

means for opening and closing each of said vapor passage means;

means for oscillating a water column contained in each of said U-tubes;

and means synchronizing the oscillation of said water columns so that when the water column is rising in an arm of said first U-tube, the water column is falling in the corresponding first arm of said second U-tube, while said vapor passage means therebetween are open, and when the water column is falling in an arm of said first U-tube, the water column is rising in the corresponding arm of said second U-tube while said vapor passage means therebetween are closed;

whereby the falling of said brackish or sea water columns in the arms of said first U-tube forms a partial vacuum above the surface and evaporation of water is induced, and the rising of said salt-free water columns in the arms of said first U-tube forms a partial densation of the water vapor therein;

and whereby the rising of said brackish or sea water columns in the arms of said first U-tube causes discharge of the water vapor therein into the corresponding arms of said second U-tube wherein the falling of the salt-free water column draws said water vapor thereinto.

8. The apparatus of claim 7 wherein said oscillating means comprise a liquid piston internal combustion engine unit arranged to deliver a predetermined quantity of brackish or sea water into said first U-tube at a point near the top of at least one of said vertical arms.

9. The apparatus of claim 7 wherein said arms are provided with means affording large evaporation and condensation surfaces in the region in which the water columns rise and fall.

10. An apparatus according to claim 7 wherein said first U-tube is connected to a relatively long vertical standpipe extending therebelow so that the maximum sea water column height in the arms of said U-tube and said standpipe is greater than that which can be supported by atmospheric pressure.

11. Apparatus according to claim 7 wherein said first U-tube is connected to a folded manometer tube having a plurality of evacuated upper loops, and its other end open to the atmosphere, so that the combined liquid heights in said first U-tube arms and the said folded manometer tube are greater than that which would be supported by atmospheric pressure.

12. Apparatus for utilizing the latent heat of a liquid solution to evaporate and distill solute-free solvent therefrom which comprises:

means maintaining a column of said liquid solution;

means alternately raising and lowering the height of said column;

means closing the top of said column-maintaining means at the commencement of and during the said lowering of said column, thereby inducing the formation of a subatmospheric pressure above said falling liquid solution column and causing evaporation thereof within said column-maintaining means; and, means opening the top of said column-maintaining means during said raising of said liquid solution column, to permit discharge of the vapors from said column-maintaining means.

13. Apparatus for condensing vapors under substantial isothermal and isobaric conditions which comprises:

means maintaining a column of a liquid;

means cyclically raising and lowering the height of said liquid column;

means opening the top of said column-maintaining means during said lowering of said liquid column to afford entry thereinto of the condensable vapors; and, means closing the top of said column-maintaining means during said raising of the liquid column whereby said vapors are condensed.

14. A process for the production of fresh water from sea water which comprises the steps of:

(1) first filling a vertical conduit with a column of sea water and closing the top of said conduit;

(2) allowing said sea water column to fall within said conduit of its own weight, while maintaining the top of said conduit closed, thereby forming a partial vacuum and causing evaporation of water within said conduit;

(3) thereafter opening the top of said vertical conduit and causing said column of sea water to rise again within said conduit to expel the said water vapor therefrom;

and repeating these said steps (1), (2), and (3), in cyclic fashion.

15. A process for utilizing the latent heat of brackish or sea water to evaporate and distill salt-free fresh water therefrom which comprises the steps of:

(1) at least partially filling a U-tube with a column of sea water;

(2) cyclically oscillating the said sea water column to rise alternately in first one arm and then in the other arm of said U-tube;

(3) closing the top of each arm of said U-tube while said sea water column therein is falling, and opening the top of each arm while said sea water column therein is rising;

whereby salt-free water vapor is formed in said U-tube during the portion of the cycle when the sea water column is falling, and is expelled therefrom during the portion of the cycle when the sea water column is rising.

16. The process of claim 15, further including the steps of:

(4) at least partially filling a second U-tube with a column of fresh water and cyclically oscillating said fresh water column to rise alternately in first one arm and then in the other arm of said second U-tube;

(5) closing the top of each arm of said second U-tube while said fresh water column is rising therein, whereby water vapor trapped in the space above said fresh water column in said closed arm is condensed;

(6) opening the top of each arm of said second U-tube when the fresh water column therein is falling, and providing communication between this arm and the arm of said first U-tube wherein a sea water column is rising in accordance with said step (3);

whereby the water vapor expelled from said first U-tube during the portion of the cycle when the sea water column is rising is drawn into said second U-tube during the portion of the cycle when said fresh water column is falling.

17. A process for utilizing the latent heat of a liquid solution to evaporate and distill solute-free solvent therefrom which comprises the steps of:

(1) maintaining a column of said liquid solution in a vertical conduit;

(2) alternately raising and lowering the height of said column;

(3) closing the top of said vertical conduit when said liquid solution column therein is being lowered, thereby inducing the formation of a subatmospheric pressure above said falling liquid column and cause evaporation of the solvent within said closed conduit; and (4) opening the top of said conduit while said liquid solution column is being raised therein, to permit discharge of the said solvent vapors from said conduit.

18. A process for condensing vapors under substantial isothermal and isobaric conditions which comprises:

(1) maintaining a column of a liquid in a vertical conduit;

(2) cyclically raising and lowering the height of said liquid column;

(3) opening the top of said conduit while said liquid column is being lowered to afford entry thereinto of condensable vapors; and (4) closing the top of said conduit while said liquid column is being raised therein, whereby said vapors are condensed.

19. A system for production of salt-free fresh water from brackish or sea water, using the latent heat of said brackish or sea water, which system comprises:

first and second conduits, said second conduit being supported concentrically within said first conduit in open communication at its lower end with the closed lower end of said first conduit;

a water immiscible liquid of specific gravity greater than 1 disposed in the bottom of each of said conduits and extending above the opening of said second conduit at all times, and freely flowing between said conduits;

an annular column of sea water floating on top of said water immiscible liquid and at least partially filling the annular space between said first and second conduits;

a column of fresh water floating on top of said water immiscible liquid and wholly contained within and partially filling said second conduit;

means providing interruptable vapor communication between said first and second conduits above the respective liquid levels therein;

means inducing cyclical oscillation to the system so that the fresh water and sea water column levels alternately rise and fall within said conduits, responsive to the movement of the other;

while opening communication between said conduits when the brackish or sea water column is rising and closing communication therebetween when the brackish or sea water column is falling;

whereby when said brackish or sea water annular column falls, a space of subatmospheric pressure is created thereabove and within said first conduit, inducing evaporation of water therein, and when said brackish or sea water column is rising, the thus-formed water vapor is discharged into said second conduit, where it is condensed into liquid water as said fresh water column rises within said second conduit.

20. The system according to claim 1 further comprising means for discharging into said space discrete droplets of said solvent above said liquid column during said lowering thereof.

21. The apparatus of claim 20 wherein said droplet discharging means comprises at least one chamber-forming means adapted to receive said solvent during said raising of said liquid column, and having wall means provided with a plurality of openings therethrough to permit said solvent to flow outwardly therefrom during said lowering of the said liquid column.

22. The system of claim 1 further including valve means for opening said space to the atmosphere to permit the gaseous content of said space to be expelled therefrom.

23. The process of claim 15 further comprising the step of, during at least one cycle, opening the top of said U-tube to the atmosphere whereby when said water column is rising therein the gaseous content of said space is expelled therefrom, and thereafter again closing the top of said U-tube.

References Cited
UNITED STATES PATENTS

| | | | |
|---|---|---|---|
| 1,231,971 | 7/1917 | Trump | 230—70 |
| 1,257,004 | 2/1918 | Humphrey | 230—70 |
| 1,258,407 | 3/1918 | Hill | 230—70 |
| 2,368,665 | 2/1945 | Kohman et al. | 203—24 |
| 2,490,659 | 12/1949 | Snyder | 202—205 |
| 2,716,446 | 8/1955 | Ross | 159—1 |
| 3,255,601 | 6/1966 | Brandon | 230—70 X |
| 3,275,532 | 9/1966 | Harper | 203—11 |

NORMAN YUDKOFF, *Primary Examiner.*

J. SOFER, *Assistant Examiner.*